United States Patent [19]

Kuromatsu et al.

[11] Patent Number: 4,913,513

[45] Date of Patent: Apr. 3, 1990

[54] MONOCABLE BIDIRECTIONAL OPTICAL FIBER CONNECTOR ASSEMBLY

[75] Inventors: Noriteru Kuromatsu; Koichiro Kuromatsu, both of Himeji, Japan

[73] Assignee: Shinko Sangyo Satsubi Yugen Kaisha, Hyogo, Japan

[21] Appl. No.: 286,007

[22] Filed: Dec. 19, 1988

[51] Int. Cl.$^4$ .................................................. G02B 6/38
[52] U.S. Cl. .................................. 350/96.21; 350/96.2
[58] Field of Search ................. 350/96.2, 96.21, 96.15; 250/227

[56] References Cited

U.S. PATENT DOCUMENTS 4,438,987  3/1984  Kapaan ........................... 250/277 X

FOREIGN PATENT DOCUMENTS 2527790  12/1983  France ............................. 350/96.21
56-74209   6/1981  Japan .............................. 350/96.21
59-123814  7/1984  Japan .............................. 350/96.2
61-110105  5/1986  Japan .............................. 350/96.2
62-240912 10/1987  Japan .............................. 350/96.21

Primary Examiner—John D. Lee
Assistant Examiner—John Ngo
Attorney, Agent, or Firm—Edwin E. Greigg

[57] ABSTRACT

A monocable bidirectional optical fiber connector assembly comprising a stationary housing including a ferrule and optical fiber cable mounted centrally thereof, and a rotatable housing inserted into the stationary housing and including a ferrule and optical fiber cable mounted centrally thereof. The two ferrules are placed in abutment with each other. One of the ferrules includes an abutment face defining a tapered recess, and the other includes an abutment face defining a tapered projection. The optical fiber cables are opposed to each other with a spacing therebetween at the abutment position of the ferrules. The connector assembly further comprises an irregular reflection preventive tube mounted peripherally of the ferrules, and a magnet mounted peripherally of the irregular reflection preventive tube.

9 Claims, 2 Drawing Sheets

MONOCABLE BIDIRECTIONAL OPTICAL FIBER CONNECTOR ASSEMBLY

BACKGROUND OF THE INVENTION

1. Field of the Invention

The present invention relates to monocable bidirectional optical fiber connector assemblies for use in interconnecting control cables of optical fiber that control rotary mechanisms in industrial robots or the like.

2. Description of the Prior Art

As shown in FIGS. 3 and 4, a conventional connector assembly A' comprises a female connector 11' and a male connector 12'. The female connector 11' includes a cylindrical spring 13' defining slits in opposite axial directions and fitted in a female housing, and a stationary ferrule 3' fitted in the cylindrical spring 13'. The male connector 12' includes a male ferrule 3'. In coupling the male connector 12' to the female connector 11', the male ferrule 3' is inserted into the cylindrical spring 13' to place the two connectors in alignment and interconnect opposed optical fiber cables 5' and 6'.

This connector assembly is designed merely for interconnecting the two optical fiber cables 5' and 6', and is not applicable to industrial robots with one part thereof in rotation and the other remaining stationary. If this connector assembly were used in such industrial robots, the optical fiber cables 5' and 6' would be twisted.

SUMMARY OF THE INVENTION

The present invention has been made to overcome the disadvantage of the prior art, and its primary object is to provide a novel monocable bidirectional optical fiber connector assembly which allows one of the optical fiber cables to rotate freely.

In order to achieve the above object, a monocable bidirectional optical fiber connector assembly according to the present invention comprises a stationary housing, a rotatable housing inserted into the stationary housing, a stationary ferrule mounted centrally of the stationary housing, a rotatable ferrule mounted centrally of the rotatable housing, the stationary ferrule and the rotatable ferrule being in abutment with each other at a rotational center of the rotatable housing, one of the ferrules including an abutment face defining a tapered recess, and the other ferrule including an abutment face defining a tapered projection, the stationary ferrule and the rotatable ferrule carrying optical fiber cables centrally thereof, respectively, the optical fiber cables being opposed to each other with a spacing therebetween at an abutment position of the ferrules, an irregular reflection preventive tube mounted peripherally of the ferrules, and a magnet mounted peripherally of the irregular reflection preventive tube.

When the rotatable housing is attached, for example, to an end of a rotary drive shaft of an industrial robot, signals are transmitted from the stationary side or from the rotatable side through the optical fiber cables. A magnetic field is formed around the connection between the two cables at this time by the magnet or by the ferrite tube due to the magnet. This magnetic field prevents dispersion and promotes convergence of light having the properties of electromagnetic wave, the light being somewhat amplified by a laser effect. Consequently, even when one of the optical fiber cables is rotated, its optical axis positively aligns with that of the stationary fiber cable, thereby to minimize the connection loss.

As noted above, the rotatable housing is inserted into the stationary housing, with the stationary ferrule and rotatable ferrule in abutment with each other at a rotational center of the rotatable housing. One of the ferrules includes an abutment face defining a tapered recess, and the other an abutment face defining a tapered projection. Thus, advantageously, the axes of the two ferrules are automatically aligned when their abutment faces are placed in pressure contact wih each other.

The two ferrules are surrounded by the irregular reflection preventive tube, which absorbs what minimal amount of light emitting from the ends of the fiber cables opposed to each other with a slight spacing therebetween. This feature has the effect of preventing irregular reflection which would cause a malfunction.

A second object of the present invention is to check dispersion and promote convergence of light at the abutment position.

To achieve the second object, a monocable bidirectional optical fiber connector assembly according to the present invention further comprises a ferrite tube mounted between the irregular reflection preventive tube and the magnet.

This construction is capable of controlling the light having the properties of electromagnetic wave, and preventing dispersion and promoting convergence of the light. Further, in combination with the laser effect, this construction achieves a very strict alignment of optical axis between the rotatable side and stationary side. This realizes the advantages of producing hardly any noise and reducing the connection loss.

Other objects and advantages of the present invention will be apparent from the following description of the preferred embodiments to be had with reference to the drawings.

BRIEF DESCRIPTION OF THE DRAWINGS

The drawings show monocable bidirectional optical fiber connector assemblies embodying the present invention, in which.

DESCRIPTION OF THE PREFERRED EMBODIMENTS

Monocable bidirectional optical fiber connector assemblies according to the present invention will be described with reference to the drawings.

Figure 1:
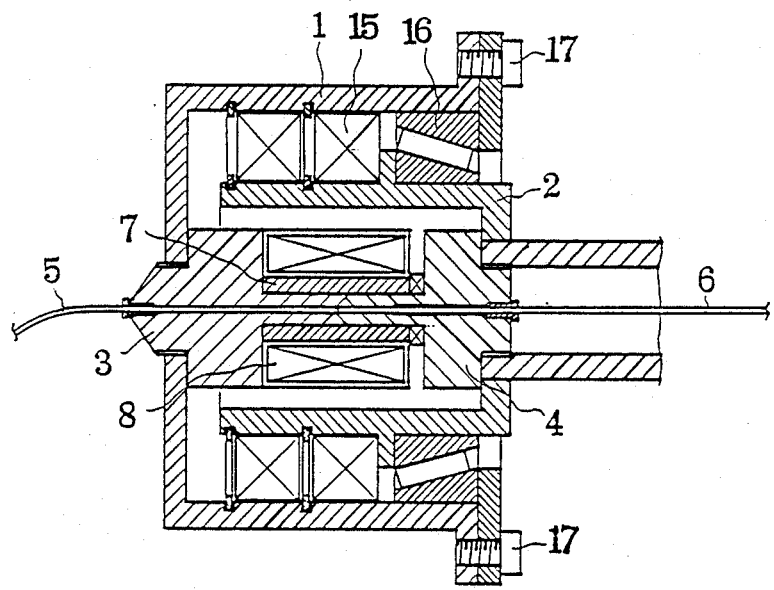
FIG. 1 is a view in vertical section of an entire connector assembly.
Figure 2:
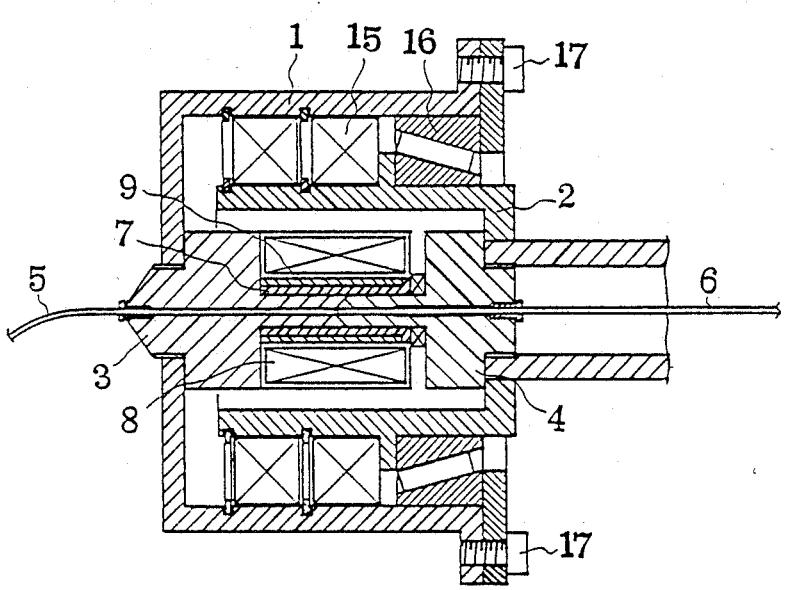
FIG. 2 is a view in vertical section of an entire connector assembly including a ferrite tube.
Figure 3:
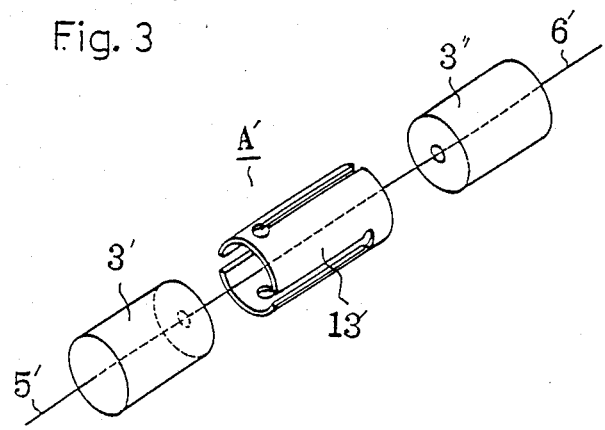
FIG. 3 is a perspcitve view of a ferrule portion of a known connector assembly.
Figure 4:
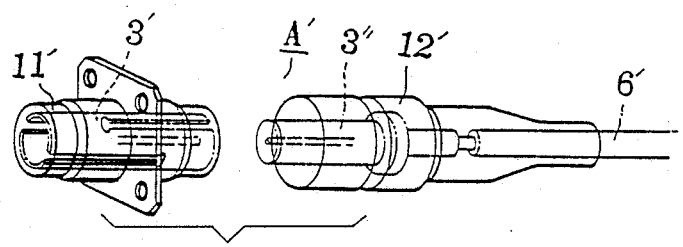
FIG. 4 is a perspective view of the known connector assembly.

A connector assembly comprises a stationary housing 1 in the form of a bottomed cylinder accommodating a rotatable housing 2. Two radial bearings 15 are mounted between the stationary housing 1 and rotatable housing 2 and held in position by stopper rings. Further, a thrust bearing 16 is provided for eliminating an axial error of the rotatable housing 2. A tightening pressure is applied to the thrust bearing 16 when bolting the bottom of stationary housing 1. A stationary ferrule 3 is provided centrally of the stationary housing 1, while a rotatable ferrule 4 is attached to the rotatable housing 2 in opposed relationship to the stationary ferrule 3. One of the ferrules 3 and 4 (the stationary ferrule 3 in the illustrated embodiment) defines an abutment end in the form of a tapered recess, while the other ferrule 3 or 4 (the rotatable ferrule 4 in the illustrated embodiment) defines an abutment end in the form of a tapered projection. Thus, the two ferrules 3 and 4 are maintained in axial alignment. Optical fiber cables 5 and 6 are inserted centrally of the ferrules 3 and 4, respectively, and are opposed to each other with a spacing of 1 to 3 micrometers (more desirably 1.5 to 2.5 micrometers) therebetween at the abutment ends of the ferrules 3 and 4. These optical fiber cables 5 and 6 are mono-axis and bidirectional, which allow signals to be transmitted both from the stationary side and from the rotational side. The ferrules 3 and 4 are formed, for example, of duralumin which is a non-magnetic material. The ferrules 3 and 4 include small diameter portions which define the abutment ends, and these small diameter portions are peripherally surrounded by an irregular reflection preventive tube 7 formed, for example, of black duracon which is a non-magnetic material. A thrust bearing is mounted between one end of the irregular reflection preventive tube 7 and the rotatable ferrule 4 to facilitate rotation. In the first embodiment illustrated in FIG. 1, the tube 7 is peripherally surrounded by a magnet, specifically an electromagnet 8. In the second embodiment illustrated in FIG. 2, the tube 7 is peripherally surrounded by a ferrite tube 9 which in turn is surrounded by a magnet, specifically an electromagnet 8. Thus a magnetic field is formed around the abutment ends.

Ferrite is a type of ferrimagnetic material having $MO.Pe_2O_2$.

Electromagnet 8 is capable of applying voltage so as to adjust intensity of the magnetic field in proportion to rotational frequency of the rotatable side.

The rotatable housing 2 is attached, for example, to an end region of a rotary drive shaft of an industrial robot, with control signals transmitted from the stationary ferrule 3 through the rotatable ferrule 4 to the rotatable side. Upon receipt of the signal from the stationary side, the rotatable side operates and moves in response to the signaled instructions, and communicates to the stationary side operation confirmation signals such as of amounts of movement and set positions, an operation completion signal, and signals of pressure, temperature and other data of various parts in the rotatable side (after converting electric signals into optical signals). Controls are effected on the movement of the rotatable side through such signal exchanges. The rotation at the opposed ends of the optical fiber cables 5 and 6 may cause an optical axis displacement, and irregular reflection resulting in a connection loss, a malfunction and inadequate communication of signals. However, the presence of the magnetic field of the electromagnet 8 or of the ferrite tube 9 due to the electromagnet 8 prevents dispersion and promotes convergence of a light beam having the properties of electromagnetic wave, thereby to minimize displacement of the optical axis in rotation. Compared with the connection loss of about 1.4 dB in the prior art, the simple connection according to the present invention, despite the more adverse situation, i.e. the connection between rotatable and stationary, allows the connection loss of about 1.4 dB or less. Thus, there occur hardly any signal transmission errors between the rotatable side and stationary side. The monocable bidirectional optical fiber connector assembly A as described is believed faultless.

The connector assembly according to the present invention is of course applicable for interconnecting two stationary optical fiber cables as well.

What is claimed is:

1. A mono-axis bidirectional optical fiber connector assembly comprising:
    a stationary housing,
    a rotatable housing inserted into said stationary housing, a stationary ferrule mounted centrally of said stationary housing,
    a rotatable ferrule mounted centrally of said rotatable housing,
    said stationary ferrule and said rotatable ferrule being in abutment with each other at a rotational center of said rotatable housing, one of the ferrules including an abutment face defining a tapered recess, and the other ferrule including an abutment face defining a tapered projection,
    each said stationary ferrule and said rotatable ferrule carrying an optical fiber cable centrally thereof, respectively,
    each said optical fiber cable being opposed to each other with a spacing therebetween at an end-to-end abutment position of said ferrules,
    an irregular reflection preventive tube mounted peripherally of said ferrules,
    a magnet mounted peripherally of said irregular reflective preventive tube, and
    a ferrite tube mounted between said irregular reflection preventive tube and said magnet.

2. A mono-axis bidirectional optical fiber connector assembly as claimed in claim 1, wherein said fiber cables are opposed to each other with a spacing of from about 1 micrometer to about 3 micrometers.

3. A mono-axis bidirectional optical fiber connector assembly as claimed in claim 2, wherein said irregular reflection preventive tube is formed of black duracon.

4. A mono-axis bidirectional optical fiber connector assembly as claimed in claim 3, further comprising a thrust bearing interposed between said rotatable ferrule and said irregular reflection preventive tube.

5. A mono-axis bidirectional optical fiber connector assembly as set forth in claim 2, in which said stationary ferrule and said rotatable ferrule are made of non-magnetic material.

6. A mono-axis bidirectional optical fiber connector assembly as claimed in claim 1, wherein said irregular reflection preventive tube is formed of black duracon.

7. A mono-axis bidirectional optical fiber connector assembly as claimed in claim 1, further comprising a thrust bearing interposed between said rotatable ferrule and said irregular reflection preventive tube.

8. A mono-axis bidirectional optical fiber connector assembly as set forth in claim 7, in which said stationary ferrule and said rotatable ferrule are made of non-magnetic material.

9. A mono-axis bidirectional optical fiber connector assembly as set forth in claim 1, in which said stationary ferrule and said rotatable ferrule are made of non-magnetic material.

* * * * *

UNITED STATES PATENT AND TRADEMARK OFFICE
CERTIFICATE OF CORRECTION

PATENT NO. : 4,913,513

DATED : April 3, 1990

INVENTOR(S) : NORITERU KUROMATSU and KOICHIRO KUROMATSU

It is certified that error appears in the above-identified patent and that said Letters Patent is hereby corrected as shown below:

Title page:

correct the Assignee as follows:

[73] Assignee: Shinko Sangyo Setsubi Yugen Kaisha, Hyogo, Japan

Signed and Sealed this

Twentieth Day of August, 1991

*Attest:*

HARRY F. MANBECK, JR.

*Attesting Officer*     *Commissioner of Patents and Trademarks*